United States Patent
Toskala et al.

(10) Patent No.: US 7,539,165 B2
(45) Date of Patent: May 26, 2009

(54) METHOD AND APPARATUS FOR DISTRIBUTED SIGNALING FOR UPLINK RATE CONTROL

(76) Inventors: Antti Toskala, Mankkaanrinne 2 C, 02180, Espoo (FI); Esa Malkamaki, Ruppakoivuntie 17 B, 02130, Espoo (FI); Guan Hao, Cheng Guang Jia Yuan east 218#1704, Chao Yang district, Beijing, 100025 (CN); Mikko J. Rinne, Tallberginpuistotie 1 C 25, 00200, Helsinki (FI); R. Thomas Derryberry, 2620 Oak Grove Dr., Plato, TX (US) 75074

( * ) Notice: Subject to any disclaimer, the term of this patent is extended or adjusted under 35 U.S.C. 154(b) by 0 days.

(21) Appl. No.: 10/156,751

(22) Filed: May 24, 2002

(65) Prior Publication Data

US 2003/0219037 A1 Nov. 27, 2003

(51) Int. Cl.
  *H04B 7/216* (2006.01)
(52) U.S. Cl. .................................. 370/335; 370/342
(58) Field of Classification Search ................ 370/310, 370/328, 329, 465, 468, 335, 342; 455/422.1, 455/434, 450, 452, 509, 511, 517, 68, 88
See application file for complete search history.

(56) References Cited

U.S. PATENT DOCUMENTS

| | | | | |
|---|---|---|---|---|
| 6,163,524 | A | 12/2000 | Magnusson et al. ......... | 370/208 |
| 6,233,231 | B1* | 5/2001 | Felix et al. ................ | 370/335 |
| 6,307,867 | B1* | 10/2001 | Roobol et al. .............. | 370/470 |
| 6,690,944 | B1* | 2/2004 | Lee et al. .................. | 455/522 |
| 6,700,881 | B1* | 3/2004 | Kong et al. ................ | 370/335 |
| 6,741,862 | B2* | 5/2004 | Chung et al. .............. | 455/452.1 |
| 6,819,930 | B1* | 11/2004 | Laroia et al. .............. | 455/450 |
| 6,836,666 | B2* | 12/2004 | Gopalakrishnan et al. .................. | 455/452.2 |
| 7,065,060 | B2* | 6/2006 | Yun et al. .................. | 370/318 |
| 7,136,428 | B2* | 11/2006 | Corbaton et al. .......... | 375/316 |
| 2001/0036823 | A1* | 11/2001 | Van Lieshout et al. ...... | 455/418 |
| 2002/0141349 | A1* | 10/2002 | Kim et al. .................. | 370/465 |
| 2002/0141367 | A1* | 10/2002 | Hwang et al. .............. | 370/335 |
| 2002/0151310 | A1* | 10/2002 | Chung et al. .............. | 455/452 |
| 2002/0154610 | A1* | 10/2002 | Tiedemann et al. ......... | 370/329 |
| 2002/0172217 | A1* | 11/2002 | Kadaba et al. ............. | 370/468 |
| 2003/0156580 | A1* | 8/2003 | Abraham et al. ........... | 370/389 |

OTHER PUBLICATIONS

3rd Generation Partnership Project; Technical Specification Group Radio Access Network; High Speed Downlink Packet Access: Overall UTRAN Description (Release 5), 3GPP TR 25.855 V0.0.8, Jun. 2001, Valbonne, France. Published on the Internet.

(Continued)

*Primary Examiner*—Steven H Nguyen
(74) *Attorney, Agent, or Firm*—Jeffrey W. Gluck

(57) ABSTRACT

A method and associated equipment for use by a first entity (17) of a radio access network (101), such as a node B, in communicating with a UE (18) so as to control an uplink rate used by the UE (18) in communicating with the first entity (17), the method characterized by: a step in which the first entity (17) transmits to the UE (18) a rate control signal (RA) conveying information regarding the uplink rate. The rate control signal may be used to command the UE (18) to adjust the maximum uplink rate in a range or set of uplink rates; alternatively, it may be used to command the UE (18) to adjust the uplink rate. The rate control signal (RA) may be sent as a response to a rate change request signal (RR) received from the UE (18) by the first entity (17).

26 Claims, 3 Drawing Sheets

OTHER PUBLICATIONS

3rd Generation Partnership Project; Technical Specification Group (TSG) RAN3; Hybrid ARQ Type II/III Iub/Iur aspects (Release 2000); 3G TR 25.8xx; V0.1.0 ; Aug. 2000. Published on the Internet.

3rd Generation Partnership Project; Technical Specification Group Radio Access Network; Report on Hybrid ARQ Type II/III (Release 2000); 3G TR 25.835; V1.0.0; Sep. 2000. Published on the Internet.

* cited by examiner

METHOD AND APPARATUS FOR DISTRIBUTED SIGNALING FOR UPLINK RATE CONTROL

TECHNICAL FIELD

The present invention is related to uplink packet scheduling in wireless communication, and more particularly to signaling (in both uplink and downlink) for uplink packet scheduling.

BACKGROUND ART

As shown in FIG. 1, according to 3G WCDMA (Third Generation Wideband Code Division Multiple Access), in communicating via wireless communication, a mobile user equipment (UE) 18 interfaces with a UTRAN (universal mobile telecommunications system (UMTS) terrestrial radio access network) Node B 17 (also sometimes called a base station) over a so-called Uu interface. The UTRAN Node B in turn communicates with a UTRAN radio network controller (RNC) 11 over a so-called Iub interface, and the RNC communicates with a core network (CN) entity, either a mobile switching center (MSC) or a serving GPRS (general packet radio system) support node (SGSN), over a so-called Iu interface, and also communicates with other RNCs over a so-called Iur interface.

The Iu interface is more specifically either an Iu circuit-switched interface IuCS between a UTRAN RNC and an MSC, or an Iu packet-switched interface IuPS between a UTRAN RNC and an SGSN.

According to the prior art, signaling in an uplink by a wireless terminal to a radio access network (RAN) for high speed downlink packet access (HSDPA) conveys for example HARQ (hybrid automatic repeat request) related information and channel quality feedback. In release 99 of UTRAN, all signaling between a UE and a RAN takes place in the radio resource control (RRC) protocol level (in layer 3 of the WCDMA protocol stack), and is terminated (in uplink) in the radio network controller (RNC) serving the UE, i.e. the SRNC. UE transmission (i.e. uplink) can be scheduled by using a transport format combination control (TFCC) message, which can indicate a rate and other parameters defining a configuration, and which is signaled by the RRC protocol. Such a TFCC message can be sent without an explicit time reference for immediate effect, or instead an explicit activation time can be included for the configuration indicated in the message. In both cases the message is originated by the RNC serving the UE (i.e. the SRNC).

A UE would want to increase its data rate if its uplink buffer is filling up. Alternatively, if the uplink buffer is emptying, the UE may be able to provide adequate service delay with a decreased data rate.

What is needed is more flexible control than what is provided using the RNC for scheduling UE transmissions for high speed packet access, control that might be described as distributed radio resource control, i.e. e.g. radio resource control terminated in a Node B (the terminology for the entity most closely resembling a base station in a second generation radio access network), and within the limits set by the SRNC for the UE inside which the Node B can schedule UE transmissions for high speed packet access. (The control here is said to be distributed because a UE can be in communication with more than one Node B at the same time, and so control that is terminated in a Node B is actually control terminated in possibly a plurality of Node Bs, as opposed to the sole SRNC, and so is distributed.) What is further needed is a way to integrate signaling for such flexible control in a channel structure currently specified for release 5 (Rel'5) of the 3GPP (third generation partnership program) specification, a channel structure such as the HSDPA channel structure. More specifically, what is further needed is a fast uplink signaling scheme where a UE is able to transmit rate information with minimum uplink code resources (in terms of multicode, i.e. in terms of code resources operating in parallel to provide different communication channels).

DISCLOSURE OF THE INVENTION

Accordingly, in a first aspect of the invention, a method is provided for use by a first entity of a radio access network in communicating with a UE (i.e. user equipment such as a mobile station) so as to control an uplink rate used by the UE in communicating with the first entity, the radio resources of the first entity being controlled by a second entity within the radio access network, the method characterized by: a step in which the first entity transmits to the UE a rate control signal conveying information regarding the uplink rate.

In accord with the first aspect of the invention, the rate control signal may be used to command the UE to adjust the maximum uplink rate in a range or set of uplink rates from which the UE chooses an uplink rate. Alternatively, and also in accord with the first aspect of the invention, the rate control signal (RA) may be used to command the UE to adjust the uplink rate. Also, the rate control signal may be a relative adjustment to the uplink rate.

Still also in accord with the first aspect of the invention, the second entity may have a signaling mechanism providing connection management and maintenance including controlling the uplink rate for the UE.

Still also in accord with the first aspect of the invention, the content of the rate control signal may be determined based on a measurement of the quality of the UE signal received by the first entity.

Still also in accord with the first aspect of the invention, the rate control signal may be received as one or more bits in one or more predetermined time slots being communicated over a dedicated physical channel (such as DL DPCH).

Still also in accord with the first aspect of the invention, the rate control signal may be transmitted in replacement of a symbol at a predetermined position in one or more predetermined time slots transmitted over a dedicated physical channel (such as a DL DPCH). Further, when the rate control signal is received, it may be replaced with zeroes and the symbol in replacement of which the rate control signal was transmitted may then be recovered in a decoding process in the UE, by using one or another type of error correction.

Still also in accord with the first aspect of the invention, the rate control signal may be sent as a response to a rate change request signal received from the UE. Further, the rate change request signal may be transmitted on an uplink acknowledgment channel (such as HS-DPCCH). Further still, the rate change request signal may be transmitted as a bit in a predetermined position in a predetermined time slot of the uplink acknowledgement channel (such as HS-DPCCH), the rate change request signal being transmitted with a frequency that is configurable by the first entity using high-level signaling. Also further, the rate change request signal may be a request to adjust the maximum allowed data rate permitted to the UE, and may be a request for relative adjustment to a pre-defined higher value of the maximum allowed data rate permitted to the UE or may be a request for relative adjustment to either a higher or a lower value of the maximum allowed data rate permitted to the UE.

In a second aspect of the invention, an apparatus is provided characterized in that it is operative according to the first aspect of the invention in respect to the UE.

In a third aspect of the invention, an apparatus of a radio access network is provided, characterized in that it is operative according to the first aspect of the invention in respect to the first entity.

In a fourth aspect of the invention, a system is provided characterized in that it comprises a first apparatus and a radio access network including a second apparatus, the first apparatus operative according to the first aspect of the invention in respect to the UE, and the second apparatus operative according to the first aspect of the invention in respect to the first entity.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides for signaling between a Node B and a UE so as to allow the UE to change either the rate at which it uplinks signals to the Node B or to change the maximum rate in a range or set of rates from which a UE selects an uplink rate. The invention will now be described in the preferred embodiment, but it should be understood that the invention is not limited to the particular embodiment described, or even to the embodiment described with the variations made express in the description. The invention encompasses any embodiment in which, in order to change its uplink rate, a UE transmits data together with a rate change request (RR) asking to either increase or decrease either the rate being used or the maximum rate in the range or set of rates being used (from which the UE selects a rate), the Node B receives the data and the RR, and the Node B then sends to the UE a request answer (RA) (in effect commanding the UE to increase, decrease, or keep unchanged its current rate or maximum rate) depending on received interference conditions or other appropriate traffic metrics either derived or measured at the Node B or sent to the Node B from an RRC. Even more broadly, the invention encompasses any signaling by a Node B (or base station) indicating whether a UE is to adjust either its rate of uplink or to adjust the maximum rate in the set or range of rates from which it selects an uplink rate.

In the case of WCDMA, the network (i.e. an RNC) configures an uplink Transport Format Combination Set (TFCS) describing all the possible uplink data rate combinations available to the UE. Within the TFC, the UE may freely select the combination of data rates for a given transmission time interval. There are various methods provided by the prior art by which an RNC signals restrictions on the TFCS. In the case of WCDMA and similar protocols, the invention provides a simple way for a Node B to signal such restrictions, by having a UE first send what is properly called a maximum rate change request, but still indicated as an RR, to a Node B, which then answers with an RA. In the description that follows, a distinction between a rate change request and a maximum rate change request will be made only if the distinction is relevant to the invention (the signaling for providing either kind of request and the corresponding answer).

Figure 2:
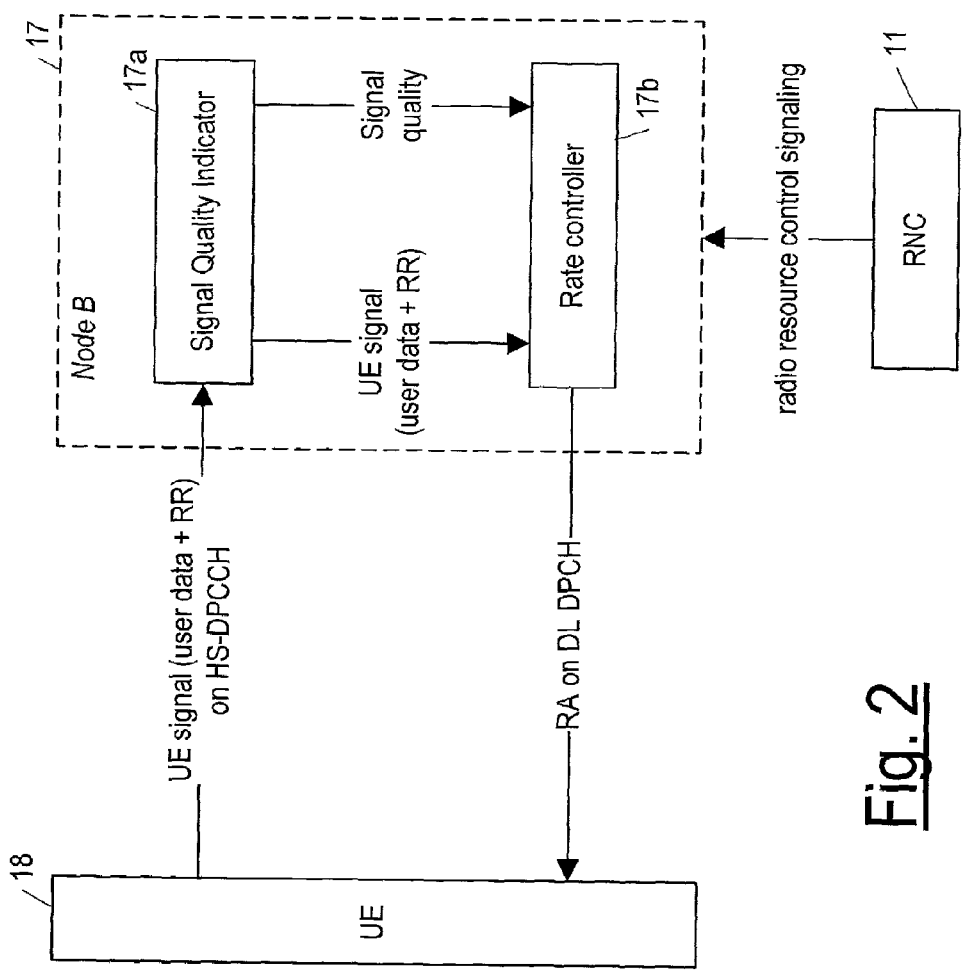
FIG. 2 is a block diagram showing the UE of FIG. 1 exchanging signals with a Node B of the UTRAN of FIG. 1 where the signals are related to the rate used by the UB in communicating with the Node B.

Referring now to FIG. 2, according to the invention in the preferred embodiment, a UE 18 signals an RR (a rate change request or a maximum rate change request) to a Node B 17 (or more generally, any entity of a radio access network at the air interface, called the Uu interface in 3G), and the Node B in response, issues an RA (a request answer), based on various parameters available to the Node B, e.g. the overall uplink load situation of the cell (allocated data rates), the signal quality of the received UE signal and the range of data rates to be controlled by the Node B allocated by a corresponding SRNC. (The radio resources available to the Node B are of course under the control of an RNC 11, which indicates to the Node B the available radio resources using radio resource control signaling, as illustrated in FIG. 2.) The RR is included in a UE signal that typically also includes user packet data. The Node B comprises a signal quality indicator 17a that monitors the signal quality of the received UE signal and others of the relevant parameters, and provides the UE received signal including the RR to a rate controller 17b also included in the Node B. It is the rate controller 17b that issues the RA after taking into account the signal quality of the received UE signal, as described below.

As explained above, an RR is a request to either increase or decrease the UE rate of uplink, or the maximum rate of uplink, by some predetermined amount, and so can be conveyed as one bit. (No RR is signaled in a transmission time interval (TTI) if the UE does not want to either increase or decrease its rate of packet uplink.) An RA issued in response to an RR provides one of three responses, either OK to increase, OK to decrease, or do not change. To do so, as in the case of an RR, only a single bit is needed, here with one value indicating OK (i.e. increase or decrease as requested), and one value for not OK (i.e. do not change). A single bit can also be used with one value for increasing the rate or the maximum rate and with the other value for decreasing the rate or the maximum rate, and with no transmission (DTX) for indicating that the rate or the maximum rate is to be kept the same. Alternatively, the RA can be provided using three different bit patterns of two bits each, one for OK to increase, OK to decrease, and do not change, making express that approval is being given for an increase or decrease. With the express approval, if the Node B erroneously received a request for an increase (due to a bit error), and if it then sends approval for an increase, but the UE did not transmit a request for an increase, then the UE ignores the RA.

The invention also comprehends signaling for adjusting the range or set of rates from which a UE selects a rate for uplink as opposed to simply either the rate in use or the maximum rate in the range or set of rates. In case of an RR that is a request to change the range or set of rates, at least two bits are required: one for indicating whether the a change in the maximum or minimum rate is being requested, and one for indicating, as before, whether the requests is to increase or decrease the maximum or minimum rate.

Uplink Signaling

Figure 3:
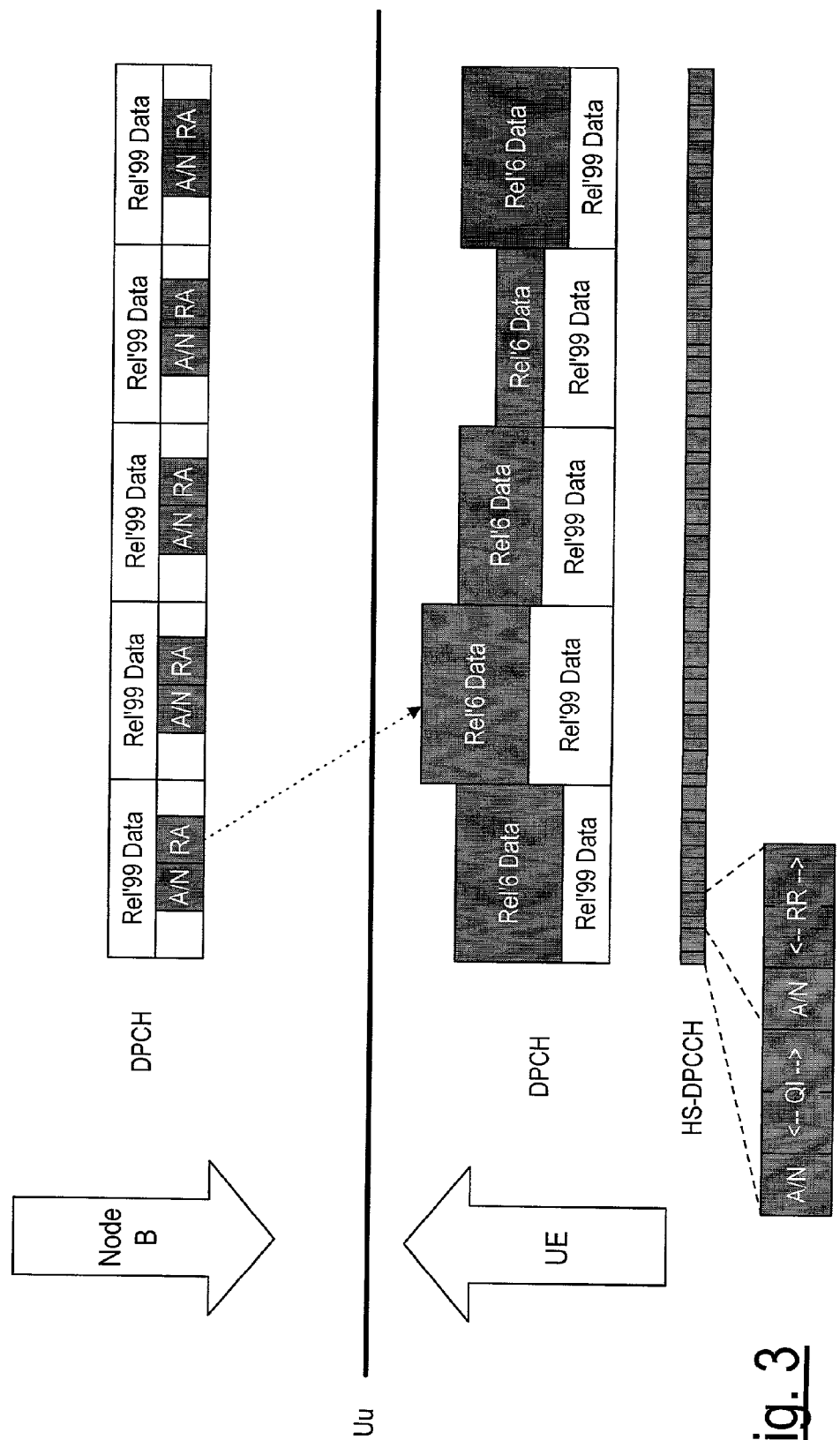
FIG. 3 is a schematic indicating how the signaling between the UE and the Node B is conveyed using channels currently specified by release 5 for HSDPA.

Referring now to FIG. 3, in the preferred embodiment the UE 18 obtains from the Node B 17 of the radio access network 101 permission to change the rate at which it uplinks signals (e.g. signals conveying packet data, including user data and control data) or permission to change the maximum rate in the range or set of rates for uplink, by first communicating an RR over the new uplink acknowledgment channel for HSDPA, called the high speed dedicated physical control channel (HS-DPCCH); as shown, according to the invention, an RR is signaled to the Node B using bits in some predetermined time slots of a 10 ms TTI. Rel'5 specifies ACK/NACK (A/N) messages for new downlink HARQ (hybrid automatic repeat request) functionality and quality indicators (QI). Every 2.0 ms, which is one TTI for HSDPA control and data signaling, three time slots are communicated by the UE over the HS-DPCCH, of which one is reserved for A/N signaling, and two for QI signaling. However, Rel'5 does not mandate that a QI indicator be provided every 2.0 ms, only that when a QI indicator is conveyed, it be conveyed in the two time slots following the time slot in which the A/N indicator is conveyed. Thus, the two time slots following an A/N time slot can occasionally be used for other signaling, and according to this example embodiment of the invention, they can be allocated for signaling an RR, which in some embodiments is communicated as a single bit, but can be communicated as two or more bits so as to provide redundancy, or to allow for requesting a change not in the rate being used, but in the maximum rate in the range or set of rates being used. In the preferred embodiment, an RR is transmitted at least once every 10 ms (the period of a physical layer (PHY) frame) but can be sent as often as every 4 ms, and, if QI functionality for HSDPA is disabled, as often as every 2 ms.

Alternatively, the uplink signaling could be implemented using a new uplink DPCCH (dedicated physical control channel), called, e.g., EU-DPCCH (enhanced uplink dedicated physical control channel). The EU-DPCCH could be sent on a separate code channel in the similar way as HS-DPCCH. The advantage is that the new EU-DPCCH would only be read by new Node Bs capable of operation according to the invention, and the UE could be in soft handover with older Node Bs, too. With EU-DPCCH, the required uplink signaling could be sent any time, in any preferred format. The drawback of adding a new code channel into uplink transmission is that peak to average power ratio of the terminal is increased.

As another alternative, an RR could be signaled using the existing DPCCH by redefining some of the DPCCH fields. For example, the feedback information (FBI) field (used in closed-loop transmit diversity schemes by which a UE sends feedback to the network) could be used, especially if downlink transmission diversity and/or site selection diversity transmission (SSDT) are not being used. In such an alternative, FBI bit(s) in given slot(s) would be used for an RR. Alternatively, the TFCI field could be used either by stealing some of the TFCI bits for an RR or by defining an RR as part of the TFCI, i.e. certain transport format combinations could mean rate increase, others rate decrease, and so on. Alternatively, new slot formats could be defined for the DPCCH. The new slot formats could include new fields dedicated for an RR, or more generally, for enhanced uplink modes. When the existing DPCCH fields are modified or redefined, extra care is needed in order not to confuse old Node Bs that may be in soft handover (SHO) with the UE sending the RR.

Still another alternative could be to use the DPDCH (dedicated physical data channel) for signaling the RRs, which could be done either by stealing some DPDCH bits or by defining a new transport channel that would be terminated in the Node B.

In addition to RR signaling, other enhanced uplink signaling, such as hybrid ARQ related information (block numbers, HARQ process numbers, new data indicators, etc.), could also be carried on the above defined signaling channel(s).

Downlink Signaling

Figure 1:
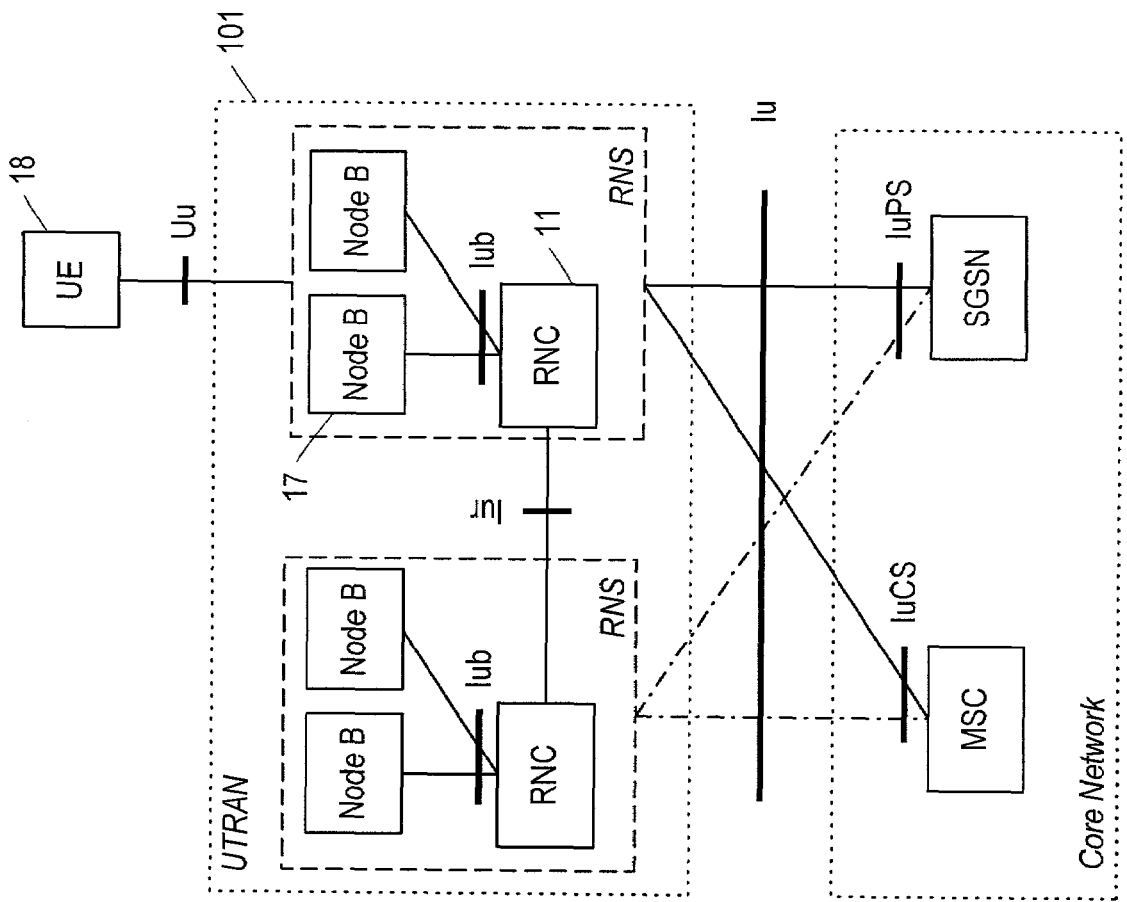
FIG. 1 is a block diagram showing a UE in communication with a UTRAN, the communication potentially including signaling according to the present invention.

Referring still to FIG. 3, the Node B 17 (FIG. 1) responds to an RR by issuing an RA over the so-called associated DL DPCH (downlink dedicated physical channel), which is associated with the new HS-SCCH (high speed shared control channel). (The DL DPCH is associated with the new HS-SCCH in that when the UE is receiving the DL DPCH, there may also be information for the UE being conveyed at the same moment on the HS-SCCH, in a 2 ms frame on the HS-SCCH.)

According to the invention in one embodiment, to provide an RA in response to an RR, the Node B 17 replaces a symbol at a predetermined location in the DL DPCH with its RA, the replacing being performed after the traffic for the DL DPCH is encoded for error correction, i.e. after redundancy is added to the traffic. The invention reUEs on there being an encoding for the DL DPCH with enough redundancy (e.g. a rate 1/2 encoder) that in decoding the DL DPCH, the UE can recover the replaced symbol when it encounters zeros at the location of the replaced symbol. The UE knows when a symbol at the predetermined location is an RA or is normal traffic (i.e. data or other control) based on whether or not the UE has communicated an RR and is expecting a response (i.e. an RA). Preferably, however, the symbol (location) is reserved for an RA even when an RR was not sent, otherwise, if by some error the Node B does not receive an RR sent by the UE, and so does not send an RA to the UE, the UE would interpret the random data symbol as an RA.

At the UE, which includes a receiver and a decoder (neither of which are shown), the receiver removes the RA from the DL DPCH data stream, replaces it with 0's, and directs the modified DL DPCH data stream to the decoder. The decoder is able to determine the symbol that was punctured more readily than if the RA bit values were left in the DL DPCH data stream.

The invention also comprehends alternative ways for downlink signaling. The downlink signaling carrying the RA (as well as other enhanced uplink signaling such as HARQ acknowledgements) could use a separate code channel, either a dedicated or a shared channel. The dedicated channel(s) would be allocated to each user, while a shared signaling channel would be shared by many users (using for example time division multiple access). The advantage of this solution is that the data content and the encoding of the data can be freely designed without affecting the other channels defined earlier. The dedicated channels, however, require dedicated codes, which are a limited resource.

Another alternative for downlink signaling is to have TFCI signaling used for sending the RA. Certain transport format combinations would indicate increase rate, while others would indicate decrease rate, and still others would indicate keep same rate. Also, the DPCCH or DPDCH could be modified such that there would be new field(s) to carry RR (and other signaling) in predefined slot(s).

Still another alternative for downlink signaling is to create a new transport channel for use in carrying the RA signaling, what might be called the RA transport channel (with the new transport channel terminated in the Node B). In the other alternatives described above, RA signaling is done by stealing resources (bits) from existing transport channels (used for other kinds of signaling). If an RA transport channel were available, physical resources could be allocated for RA signaling without in any way affecting other signaling.

An RA transport channel could also be what might be called a virtual transport channel, in the sense that it would be set up by higher layers as a transport channel, but the information content would be filled in by the physical layer or, e.g., by the MAC layer. The presence of the virtual transport channel would be signaled using a normal TFCI. For less time critical signaling, the signaling information could go through all the normal channel coding and interleaving operations defined for transport channels. If the RA (or some other signaling) is considered to be very time critical, it could be sent only in some predefined slots using bit positions reserved for the virtual transport channel, and the addition of the bits used to convey the signaling could be done after the channel interleaving in order to avoid the delay caused by the interleaving operation.

Adjusting the Rate of Making Rate Change Requests

Still referring to FIG. 3, in the embodiment being described, the RA is usually provided as a symbol in a slot following the slot in which an A/N symbol is transmitted by the Node B (although any predefined slot could be used, and the slot being used could even be configurable by higher layer signaling), and such downlink signaling is performed only after receiving an RR from a UE, which, normally, happens only once every 10 ms (an uplink TTI). Since a Node B operative according to the invention alters the DL DPCH traffic and so acts somewhat like noise, it may be advantageous for a UE to sometimes slow down how often it sends RR's to the Node B, depending on conditions. According to the invention, higher-level signaling, via the DL DPCH, is used by the Node B to instruct a UE to slow down or to increase its rate of transmitting RRs. As explained above, to transmit RRs, the UE uses some slots that would otherwise be used to transmit QI data. To speed up the rate of RR signaling, the UE would use a higher percentage of such slots, and to slow down, it would use a lower percentage. In every case, in the preferred embodiment, it would be understood that the Node B would respond with an RA (increase, decrease, or keep the same rate) at some predetermined time after receiving an RR. In some applications, in slowing down the rate (or the maximum rate) at which RRs are issued, each rate/maximum rate change that results is a larger change than in case of more frequent RR signaling. Thus, if the rate of RR signaling is slowed by a factor of two from a first rate of RR signaling, each RA allowing a rate or maximum rate increase or decrease is understood to allow such a change by an amount that is twice as large as for the first rate of RR signaling.

Overall Method for Signaling for Scheduling Packet Uplink

Figure 4:
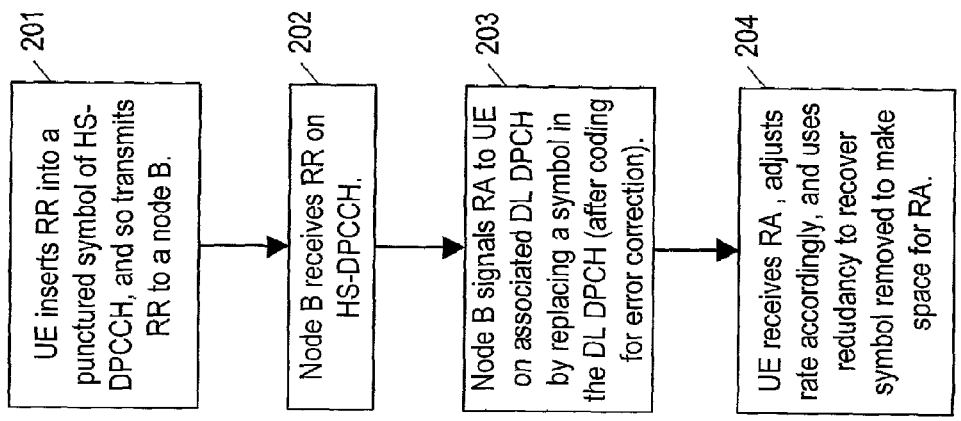
FIG. 4 is a flowchart of the signaling according to the invention.

Referring now to FIG. 4, a flow chart shows a method of signaling according to the invention by which a UE 18 seeks permission from a Node B for a change in either the rate being used or the maximum rate in the range or set of rates from which the UE selects a rate (depending on whether the protocol in use allows for the UE to select from a range or set of rates). The method includes a step 201 in which the UE inserts a properly channel encoded RR into a predefined slot(s) of the HS-DPCCH, and so transmits the RR to a Node B. In a next step 202, the Node B receives the RR. In a next step 203, the Node B signals an RA to the UE using the DL DPCH, and more specifically, by providing the RA as a symbol (or several symbols) at (a) predetermined location(s) in the DL DPCH data stream in place of whatever symbol would have been transmitted in that location, the replacing being performed after the traffic for the DL DPCH is encoded for error correction, i.e. after redundancy is added to the traffic. In a next step 204, the UE receives the RA, extracts the RA from the DL DPCH, replaces the corresponding bits with zeroes, and recovers the symbol that was removed to make space for the RA based on redundancy in the DL DPCH data stream.

Discussion

The invention thus provides for having a base station (or Node B) signal to a UE a capacity allocation for uplink, i.e. capacity allocation being either a command to change the rate of uplink being used or permission to change the maximum rate in the range or set of rates from which the UE selects an uplink rate (or, even more generally, permission to change either the maximum or minimum rate in the range or set of rates from which the UE selects an uplink rate). In case of applications in which a UE is able to select an uplink rate from a set or range of uplink rates, such as in WCDMA applications, the signaling used to make the capacity allocations adjusts the maximum rate (or adjusts either the maximum or minimum rate, depending on the embodiment).

In the prior art, another set of signaling messages, the RRC protocol signaling messages, is provided by another entity in the RAN, the serving RNC, and is used for the same purpose as the above described signaling messages. The RRC protocol (layer) implemented in the serving RNC is responsible for connection management and maintenance, and the mechanism to change the uplink data rates is built into the RRC. What the present invention adds is the ability for the serving RNC to delegate to a Node B a part of the connection management and maintenance responsibility, namely uplink radio resource control, with restrictions which it can control, based on a bit-efficient signaling mechanism. Preferably, the RRC protocol still provides means to accomplish all the same connection management and maintenance functions, and has precedence over the Node B terminated signaling provided by the invention.

It should be understood that the invention also comprehends having a Node B signal to a UE a change in rate, or a change in maximum rate, without first having received an RR from the UE. In such a case the RA signal is not in answer to a request, and is more properly called a rate control signal, but is still here designated by RA. The Node B would send such a rate control signal to a UE based on the current uplink load of the Node B. Another situation in which a Node B would issue a rate control signal to a UE without first having received an RR is when the UE is in soft handover to the Node B by another Node B. In that case, the receiving Node B may need to reduce the rate of uplink or the maximum rate used by the UE. According to the invention, irrespective of the signaling by a UE, the UE will comply with any RA signal from a Node B.

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method of uplink data rate control, the method comprising:

transmitting a rate change request signal to a first network entity by inserting the rate change request into a punctured symbol in an uplink channel;

receiving a rate control signal from said first network entity on a downlink channel different from said uplink channel;

extracting the rate control signal from the downlink channel and replacing bits of a punctured symbol that correspond to the rate control signal with zeroes; and recovering bits removed from the downlink channel for the bits of the punctured symbol that correspond to the rate control signal based on redundancy in the downlink channel, wherein a frequency of the rate change request signal is configurable by said first network entity using high-level signaling.

2. The method according to claim 1, wherein a second network entity provides radio resource information to said first network entity.

3. The method according to claim 1, wherein said rate control signal is determined based at least in part on at least one signaling parameter available to said first network entity.

4. The method according to claim 3, wherein said at least one signaling parameter includes an indication of channel quality.

5. The method according to claim 1, further comprising: adjusting an uplink rate based on said rate control signal.

6. The method according to claim 5, further wherein said adjusting comprises:
adjusting a maximum uplink rate in a range or set of uplink rates based on said rate control signal.

7. The method according to claim 1, wherein the rate control signal indicates a relative increase or decrease in rate to a predetermined rate value and does not include said predetermined rate value.

8. The method according to claim 1, wherein said receiving comprises:
receiving said rate control signal as one or more bits in one or more predetermined time slots of a dedicated physical channel.

9. The method according to claim 1, wherein said receiving comprises:
receiving said rate control signal transmitted in replacement of a symbol at a predetermined position in one or more predetermined time slots of a dedicated physical channel.

10. The method according to claim 1, wherein said transmitting comprises:
transmitting the rate change request signal on an uplink acknowledgment channel.

11. The method according to claim 10, wherein the rate change request signal is transmitted as a bit in a predetermined position in a predetermined time slot of the uplink acknowledgment channel.

12. The method according to claim 1, wherein the rate change request signal is a request to adjust a maximum allowed uplink data rate.

13. The method according to claim 12, wherein the rate change request signal adjusts the maximum allowed uplink data rate to a predetermined higher maximum allowed data rate or to a predetermined lower maximum allowed data rate, and wherein the rate change request signal does not include a value of said predetermined higher or lower maximum allowed data rate.

14. A method of uplink data rate control, the method comprising:
receiving a rate change request signal sent from a user station by inserting the rate change request into a punctured symbol in an uplink channel; and
transmitting a rate control signal to said user station on a downlink channel different from said uplink channel;
extracting the rate control signal from the downlink channel and replacing bits of a punctured symbol that correspond to the rate control signal with zeroes; and
recovering bits removed from the downlink channel for the bits of the punctured symbol that correspond to the rate control signal based on redundancy in the downlink channel,
wherein a frequency of the rate change request signal is configurable by said user station using high-level signaling.

15. The method according to claim 14, further comprising:
receiving radio resource information from a different network entity that is not said user station.

16. The method according to claim 15, wherein said receiving comprises:
receiving connection management and maintenance information regarding a radio access network from said different network entity, wherein said connection management and maintenance information does not include direct uplink data rate control information for said user station.

17. The method according to claim 14, wherein said rate control signal includes a command to the user station to adjust an uplink data rate.

18. The method according to claim 17, wherein the command indicates a relative increase or decrease the uplink data rate to a predetermined value and does not include said predetermined value.

19. The method according to claim 14, further comprising:
determining said rate control signal based at least in part on at least one signaling parameter.

20. The method according to claim 19, further comprising:
obtaining an indication of channel quality, wherein said at least one signaling parameter includes the indication of channel quality.

21. The method according to claim 14, wherein said transmitting comprises:
transmitting said rate control signal as one or more bits in one or more predetermined time slots of a dedicated physical channel.

22. The method according to claim 14, wherein said transmitting comprises:
transmitting said rate control signal transmitted in replacement of a symbol at a predetermined position in one or more predetermined time slots of a dedicated physical channel.

23. The method according to claim 14, wherein said receiving comprises:
receiving the rate change request signal on an uplink acknowledgment channel.

24. The method according to claim 23, wherein the rate change request signal is received as a bit in a predetermined position in a predetermined time slot of the uplink acknowledgment channel.

25. The method according to claim 14, wherein the rate change request signal is a request to adjust a maximum allowed uplink data rate.

26. The method according to claim 25, wherein the rate change request signal adjusts the maximum allowed uplink data rate to a predetermined higher maximum allowed data rate or to a predetermined lower maximum allowed data rate, and wherein the rate change request signal does not include a value of said predetermined higher or lower maximum allowed data rate.

* * * * *